United States Patent [19]

Gundlach et al.

[11] Patent Number: 5,674,550
[45] Date of Patent: Oct. 7, 1997

[54] PROCESS FOR PREPARING SUBSTANTIALLY FAT FREE MEAT

[75] Inventors: Larry C. Gundlach; Andrew L. Milkowski, both of Madison; Sherel Frederick Nutt, Oregon; William T. Paulos, McFarland, all of Wis.

[73] Assignee: Kraft Foods, Inc., Northfield, Ill.

[21] Appl. No.: 510,993

[22] Filed: Aug. 3, 1995

[51] Int. Cl.⁶ .................. A23L 1/31; A23L 1/314
[52] U.S. Cl. .................. 426/641; 426/480; 426/513; 426/518
[58] Field of Search .................. 426/480, 641, 426/645, 646, 513, 518

[56] References Cited

U.S. PATENT DOCUMENTS

| | | | |
|---|---|---|---|
| 2,745,856 | 5/1956 | Dayen et al. | 554/8 |
| 2,911,421 | 11/1959 | Greenfield | 554/8 |
| 3,063,840 | 11/1962 | Sullivan. | |
| 3,141,774 | 7/1964 | Little. | |
| 3,177,080 | 4/1965 | Alberts. | |
| 3,270,041 | 8/1966 | Artar et al. | 554/8 |
| 3,295,982 | 1/1967 | Hickey et al.. | |
| 3,449,315 | 6/1969 | Aikins. | |
| 3,539,549 | 11/1970 | Greenfield. | |
| 3,627,538 | 12/1971 | Webb et al.. | |
| 3,734,741 | 5/1973 | Larsen. | |
| 3,780,191 | 12/1973 | Langer et al. | 426/231 |
| 3,804,958 | 4/1974 | Adams. | |
| 3,851,074 | 11/1974 | Gillespi. | |
| 3,930,991 | 1/1976 | Gillespi. | |
| 4,137,335 | 1/1979 | Holm et al. | 426/417 |
| 4,201,302 | 5/1980 | Roth | 209/577 |
| 4,210,677 | 7/1980 | Huffman | 426/641 X |
| 4,377,597 | 3/1983 | Shapiro et al. | 426/641 X |
| 4,378,379 | 3/1983 | Liesaus | 426/641 X |
| 4,534,229 | 8/1985 | Funk et al.. | |
| 4,544,560 | 10/1985 | O'Connell | 426/513 X |
| 4,567,050 | 1/1986 | Roth | 426/417 |
| 4,728,524 | 3/1988 | Gagliardi | 426/513 X |
| 4,778,682 | 10/1988 | Chapman | 426/248 |
| 4,975,294 | 12/1990 | Cohen | 426/513 X |
| 4,980,185 | 12/1990 | Small | 426/417 |
| 5,164,213 | 11/1992 | Bonkowski | 426/281 |
| 5,167,977 | 12/1992 | Gamay | 426/417 |
| 5,215,772 | 6/1993 | Roth | 426/231 |
| 5,221,554 | 6/1993 | Gamay | 426/646 |
| 5,286,514 | 2/1994 | Webb et al. | 426/646 |
| 5,368,878 | 11/1994 | Smick et al. | 426/646 |
| 5,382,444 | 1/1995 | Roehrig et al. | 426/646 |
| 5,439,702 | 8/1995 | French | 426/641 |

FOREIGN PATENT DOCUMENTS

| | | |
|---|---|---|
| 974154 | 11/1964 | United Kingdom. |
| 1046642 | 10/1966 | United Kingdom. |
| 2244999 | 12/1991 | United Kingdom. |
| WO9108680 | 6/1991 | WIPO. |

OTHER PUBLICATIONS

Froning and Johnson, Improving the Quality of Mechanically Deboned Fowl Meat by Centrifugation, 38 Journal of Food Science, 270–272.

Primary Examiner—Arthur L. Corbin
Attorney, Agent, or Firm—Lockwood, Alex, Fitzgibbon & Cummings

[57] ABSTRACT

Fat free meat products are provided which incorporate whole muscle components that are selectively and precisely separated from larger whole muscle groups, such as hams. The whole muscle components have a weight percent fat of not greater than 1.5. The fat free meat products have a fat percentage of about 0.9 weight percent or below. Typically, the fat free meat also includes finely textured reduced fat meat such as that processed by grinding and centrifuging. Residual trim cuts, formed during subdivision of the whole muscle groups, are greatly reduced in fat content by removing gristle or connective tissue or other fatty tissue from these residual trim cuts.

37 Claims, 3 Drawing Sheets

2

PROCESS FOR PREPARING SUBSTANTIALLY FAT FREE MEAT

BACKGROUND OF THE INVENTION

The present invention relates to meat products of the fat free variety and to a process for producing same on a production scale basis, and more particularly to fat free meat products having a fat percent by weight equal to or less than that allowed by controlling governmental agencies for meat products permitted to be labeled as fat free. A typical fat free fat percentage is less than about one percent by weight. For example, the United States Nutritional Labelling and Education Act (NLEA) regulations require that for a non-entree meat to be labelled as "fat free", it must have less than 0.5 gram of fat per serving and reference amount, which is 55 grams for a sliced meat. This translates to a definition of fat free being equal to or less than 0.91 percent by weight of fat in a non-entree meat product.

Awareness of fat intake has lead consumers to value highly those food sources which are relatively low in fat or have virtually no fat content. Traditionally, many meat products have been perceived by certain groups as being products that are relatively high in fat content. Various techniques have made available meat products having fat percentages of 5% or less, such as at the 1% to 4% by weight level of fat in the meat product. Examples are turkey breast products which can achieve fat levels at the lower values of these ranges.

Consumer perception has developed along these lines to the extent that there is a desire to have even these relatively low fat percentages reduced further, ideally to arrive at a fat free condition or a nominally fat free condition. For example, current guidelines which are followed by the USDA permit packaged meat products to be labeled as "fat free" provided the amount of fat in the packaged sliced meat or sausage product is less than 0.5 gram of fat per 55 grams, which is less than 0.91 percent by weight of the total packaged meat product. Such a product is thus properly designated as "free" of fat, and nutritional labeling properly specifies a zero ("0") as the reported fat content. Accordingly, there is an important need for meat products having a fat content which meets these zero or nominal zero levels.

In the past, certain fat free meat products, that is those meeting the governmental guidelines specified above, have been commercialized on a production scale basis. Typically, these are fat free turkey and chicken whole muscle (often breast) products. Other fat free products have been formulated from traditionally higher fat content sources. Such products typically are of the comminuted or ground variety. Examples include fat free frankfurters, hot dogs or wieners and other sausage type products such as bologna and other luncheon meat which is not of the so-called whole-muscle type, but is formed from batters, grinds or emulsions. The reformulation of such products in order to reduce fat levels can be aided by the inclusion of non-meat components that generally dilute the fat which is present in the meat that is included within the batter, grind or emulsion from which the sausage product is formed. It is often the case that these fat free products, when subjected to taste tests, score significantly lower than corresponding products which are not of the fat free variety. Therefore, it would be desirable and extremely important to be able to produce fat free meat products from higher fat meat sources which are not of the ground emulsified type and which, when subjected to taste testing, score at a level that is more generally in agreement with taste test scores for corresponding products that are not fat free or that include traditional levels of fat.

Fat free meat products which are made from pork or ham and the like that are currently available on a production line scale often do not exhibit texture characteristics of corresponding meat products which are not within the fat free category. Such texture differences, especially when combined with taste differences, can provide consumers with a perception that these fat free products do not elicit the eating experience which has been viewed positively in connection with the taste and texture of higher fat or traditionally high fat corresponding products. Examples of positively perceived texture attributes are the appearance and mouth feel of natural whole muscle meat cuts or slices which have no ground or emulsified components. These attributes are typically not attainable by a comminuted or ground meat product, even when sliced, especially when compared with a slice directly made from a natural whole muscle piece of meat. Thus, it would be desirable to have a production scale, manufactured-type of meat product made from sources such as pork or ham which are not naturally lean enough to meet the fat free criteria, especially while exhibiting natural whole muscle characteristics and texture attributes that equal or approximate those associated with corresponding traditionally prepared whole muscle meats, such as sliced smoked cooked ham.

A long-recognized difficulty in reducing the fat content of traditional meat cuts that are provided in natural muscle form is the variation in fat content from animal to animal. Attempts to address this difficulty have included modification in and tight control of the diets of the animals, as well as selective breeding practices and other approaches founded in the biological or chemical sciences which are directed toward modification of the animals themselves in order to reduce fat formation within the animals prior to slaughter. This approach has met with some success, although the fat reduction levels typically do not allow for natural muscle or traditionally cut whole muscle products which satisfy fat free criteria. For example, traditional natural meat cuts from such animals still have fat contents in excess of 1%, usually multiples of these levels.

Accordingly, it is a general object of the present invention to provide an improved meat product that has a fat content which is at or below regulatory definition(s) of fat free meat products which are typically below one weight percent fat based on the total weight of the meat product, the exemplary USDA adopted level being less than 0.5 gram of fat per serving, which is the total weight of whole units closest to 55 grams and per reference amount for sliced non-entree meat products.

Another object of the present invention is to provide an improved fat free ham which is cured, shaped, and (if desired) sliced in accordance with traditional practices and which has a nominal fat content of zero.

Another object of this invention is to provide an improved process and fat free meat product which eliminates many of the fat sources found in traditional pork cuts, especially the leaner cuts of pork including those that are the traditional materials for ham, so as to result in the production of a meat supply that is in the vicinity of one weight percent fat or lower and which, when formulated into a finished meat product has a fat weight percent of below 1%, typically at or below 0.9 weight percent.

Another object of the present invention is to provide a fat free ham and water product, chopped and formed, and an improved process for producing same which incorporates low fat core meat cuts together with finely textured reduced fat meat and a water composition.

Another object of the present invention is to separate meat whole muscle into muscle "core meat" cuts and "residual trim" cuts, the latter having a significantly higher fat level, and processing the residual trim cuts to remove gristle and connective tissue in order to thereby remove a substantial contributor to the fat content of the residual trim cuts for use in preparing fat free meat products.

Another object of the present invention is to utilize mechanical approaches for removing gristle and connective tissue from meat pieces in order to substantially reduce the fat content of the meat pieces.

SUMMARY OF THE INVENTION

The invention is directed to fat free meat products such as fat free ham. These products have a fat percentage within the levels mandated for "fat free" labeling and/or for "zero" fat nutritional labeling, currently at 0.5 gram per 55 grams of meat products for non-entree types of products. This translates to at or below about 0.9% by weight fat, based upon the total weight of the meat product. The meat product includes muscle core meat cuts (as described herein) that are of unusually low fat content which is typically below about 1.5 weight percent fat. The product preferably also includes finely textured reduced fat meat, combined with a brine-type water composition, in order to produce a meat product having substantial natural or whole muscle content and which has a fat content at the target "fat free" level. Other components can be included as discussed herein. The product is of a mass-produced, production scale type and can be packaged in sliced or unsliced forms.

The process for producing the fat free meat is carried out on a production scale basis and in accordance with production line procedures. The process includes supplying whole muscle meat cuts and separating them into muscle core meat cuts and residual trim cuts in accordance with specific guidelines such that the muscle core meat has a fat percentage which is typically less than about 1.5 weight percent, often considerably lower, such as at or below 1.4 weight percent, 1.3 weight percent, 1.2 weight percent or 1.1 weight percent for example. The muscle core meat cuts can be combined with finely textured reduced fat meat, such as that obtained by grinding and centrifuging meat supplies on a controlled basis in order to provide a finely textured reduced fat meat having a fat percentage of less than about 1.5 weight percent, often considerably lower, such as at or below 1.4 weight percent, 1.3 weight percent, 1.2 weight percent or 1.1 weight percent for example. The muscle core meat cuts and (when included) the finely textured reduced fat meat is combined with a brine or brine-type water composition and placed into a confined space for forming this composition into the fat free meat product.

In another aspect of the invention, the residual trim cuts are processed by a suitable approach, such as mechanical equipment, in order to remove gristle and connective tissue from these residual trim cuts to levels at or below 2 weight percent, often considerably lower. It has been found that this removal dramatically reduces the fat content of the residual trim cuts to levels at or below 2 weight percent, often considerably lower. Thereafter, if desired in combination with fat removal such as by the use of membrane skinners, such modified residual trim cuts, often after mechanical separation processing, can be incorporated into the meat block that has the desired fat free characteristics.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF PREFERRED EMBODIMENTS

Certain specific information specified herein is directed to embodiments wherein the fat free meat is fat free ham or fat free ham and water product, chopped and formed. It will be understood and appreciated that the principles of the invention can be applied in a similar fashion to other of the leaner porcine cuts.

Bone-in hams from porcine animals are collected in commercial quantities. The preferred ham supply for the present invention is of fresh hams that have not been previously frozen. It is further preferred that the animal sources for the bone-in hams are lean and highly muscled and have relatively low internal fat (marbling). It has been determined that even these relatively low fat bone-in hams are too high in fat content so as to be usable, without modification, to make fat free ham products.

These hams are separated into what can be referred to as muscle core meat cuts and residual trim cuts. The former have a substantially lower fat percentage than do the latter. In this connection, three different muscle groups are targeted. For convenience, each ham is preferably first subdivided into these three muscle groups. Thereafter, these muscle groups are further subdivided into muscle core meat cuts, which are very lean, and residual trim cuts, which have a higher proportion of fat.

Typical bone-in ham sources are categorized as seventeen-pound to thirty-two pound butcher hams from extra lean hog supplies. The three muscle groups are designated as "inside core meat", "knuckle core meat" and "outside core meat". The inside core meat is composed of Semimembranous muscle. The knuckle core meat is composed of the Quadriceps femoris muscle, the Rectus femoris muscle and the Vastus lateralis muscle. The outside core meat is composed of the Biceps femoris muscle.

These core meat muscles, according to the present invention, are separated from surrounding muscle components as will be disclosed in greater detail hereinafter. Exemplary muscles that preferably are not included within the muscle core meat are the following: outer butt (Gluteus medius); knuckle cap (Tensor fasciae latae); upper and lower shank (Flexur digitorum superficialis and gastrocnemis); tenderloin (Psoas major, Iliacus and Satorius); portions of the outside muscle (Semitendinous, Gluteus superficialis and Gluteobiceps); and top butt (Gluteus accessorius and Gluteus profundus).

In one embodiment of the invention, all three of the muscle core meat cuts are combined in making the fat free ham. In another embodiment, only two of these muscle core meat cuts are combined, preferably the inside core meat cuts and the knuckle core meat cuts. If desired and if feasible from available sources, a single muscle core meat cut could be used.

Figure 1:
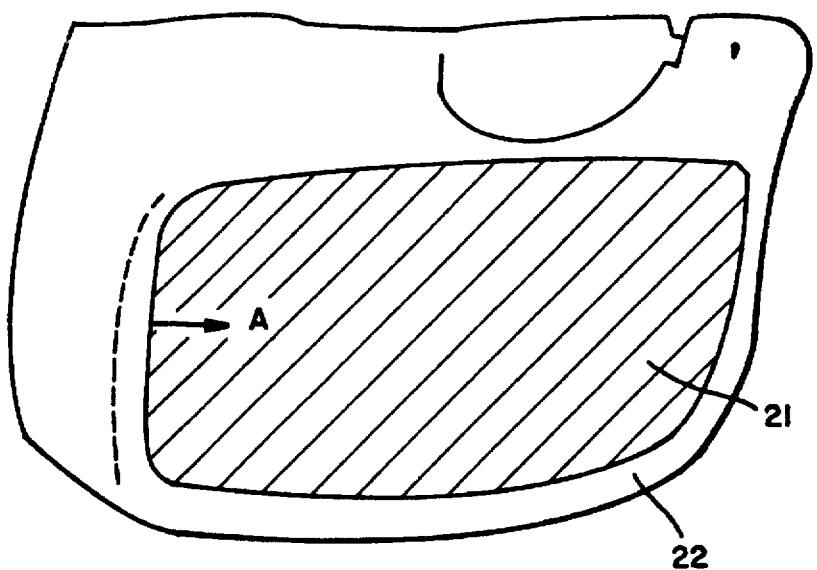
FIG. 1 is a schematic illustration of the front view of an Inside ham muscle from which the inside core meat cut is taken.
Figure 2:
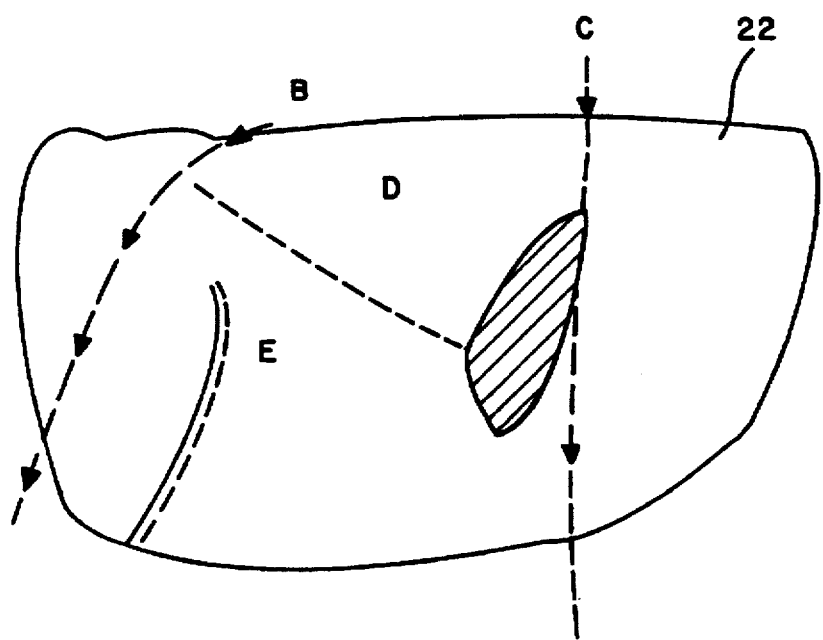
FIG. 2 is a schematic view of the back of the Inside muscle illustrated in FIG. 1.

With more particular reference to separation of the inside muscle core meat from the Inside ham muscle, this is illustrated in FIG. 1 and FIG. 2. The procedure is preferably begun by removing the Gracilis cap 21 from the outer surface of the Inside muscle (Semimembranous 22). See cut line A. At this time, it is preferred to remove as much as possible of the loose webby fat with the Gracilis cap. The Gracilis cap itself is incorporated into the residual trim cuts being collected for further processing as desired. For this reason, the Gracilis cap should be membrane skinned before being added to the residual trim collection.

Reference is now made to FIG. 2 which illustrates further steps in preparing the inside core meat. With the use of an appropriate cutting tool such as a knife, and preferably with a single cutting movement, the dark muscle sections that attach the Inside muscle to aitch bone (pelvic bone) are removed. This includes removal of the connective tissue (in the seam) together with the dark section (Pectineus). This cutting is accomplished along cut line B. In addition, the dark muscle flap on the internal surface of the Inside muscle (commonly referred to as the "red eye") is opened by one cutting movement of a knife or the like. Once this red eye flap has been opened, but not removed, another single cut is made perpendicular to the top edge of the Inside muscle, thereby completely removing the more marbled outer edge (the dorsal edge), this being illustrated at cut line C. In this way, the most marbled portion of this muscle is removed. In the event that the marbling penetrates deeper into the inside core meat tissue, more of the Inside muscle may be removed with a similar cut.

A fourth cut is made to remove a series of veins containing significant amounts of fatty tissue. Placing the tip of the knife at the top ventral corner of the Inside muscle, a forty-five degree angle cut from the top edge of the muscle is made. A cut of approximately one-half inch in depth is made, after which the knife blade is moved parallel to the cutting surface so as to move the blade out of the muscle toward the top edge. This is illustrated at cutting line D. A small piece is removed by this cut for addition to the residual trim cuts collection.

A final step in this inside core meat preparation is illustrated at cut line E in FIG. 2. This opens the seam on the lateral surface of the Inside muscle just below the aitch bone attachment. Then, a membrane skinner is used to clean any fat when this seam is thereby opened.

The remaining portion of the Inside muscle is the untrimmed inside core meat. Preferably, this muscle is further trimmed using a membrane skinner or the like to remove all surface fat and gristle. With all trimming completed, the resulting Inside muscle core meat cut is appropriately collected or otherwise designated as such. In a preferred embodiment, this resulting inside core meat cut has a fat percentage of between about 0.9 weight percent and about 1.3 weight percent, preferably between about 0.95 and about 1.25 weight percent, most preferably between about 1 and about 1.2 weight percent fat, based upon the total weight of the inside core muscle cut.

Figure 3:
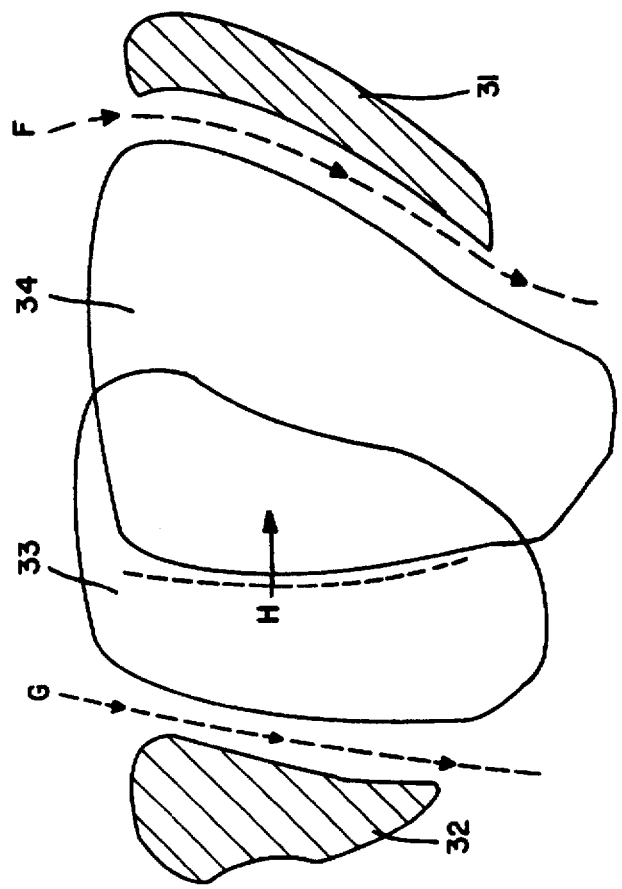
FIG. 3 is a schematic view illustrating knuckle core meat separation from Knuckle ham muscle.

FIG. 3 illustrates separation of the knuckle core meat cut from the Knuckle muscle. As a first step, the small, slightly marbled outer edge (Vastus intermedius) 31 is removed and added to the residual trim cut collection. This is illustrated as cut line F. Next, the larger dark muscle (Vastus medialas) 32 on the opposite side of the main body of the Knuckle muscle is removed. This is illustrated at cut line G. It is preferred to include in this removed piece the connective tissue between the seam. The removed piece, with or without this connective tissue, is added to the residual trim cut collection.

There remain two pieces of the Knuckle muscle, namely the Rectus femoris 33 and the Vastus lateralis 34. It is preferred that these two Knuckle muscle pieces be separated along their natural seam, illustrated at cut line H. Preferably, this is accomplished by having the knife blade "ride" along the connective tissue seam in order to avoid cutting of the connective tissue, after which it is very difficult to complete separation along the remaining seam. These two remaining Knuckle muscle pieces comprise the untrimmed core meat. Preferably, they are further trimmed with a membrane skinner so as to remove surface fat and gristle. The resulting knuckle core meat pieces are the knuckle muscle core meat cuts, and they have a fat content of between about 0.7 and about 1.1 weight percent fat, preferably between about 0.75 and about 1.05 weight percent, most preferably between about 0.8 and about 1 weight percent fat, based upon the total weight of the pieces.

In one aspect of the invention, these knuckle core meat pieces are combined with the inside core meat pieces in order to provide the muscle core meat cuts. It will be appreciated that these cuts will have an average fat content which typically will be somewhat greater than the fat free level. This combination should always have a combined fat percentage of less than about 1.5 weight percent. Typically, the combined fat percentage of this two muscle core meat combination is on the order of about 1.2 weight percent, based upon the total weight of the core meat.

In a preferred embodiment, a quantity of finely ground reduced fat meat is incorporated with the muscle core meat cuts. In this regard "reduced fat" does not necessarily denote compliance with a regulatory definition of "reduced fat" meat, although often this meat will be in compliance. Generally speaking, this finely textured reduced fat meat is directed toward meeting one or both of two objectives. They are reduced cost and lowering of the average fat percentage. In a typical approach, this finely textured reduced fat meat is a made by a process that includes grinding and centrifuging a supply of meat, such as meat originating from the residual trim cuts collected during formation of the muscle core meat cuts. An exemplary process and finely textured reduced fat meat is described in Roehrig et al U.S. Pat. No. 5,382,444, incorporated by reference hereinto. A typical finely textured reduced fat meat will have a fat percentage of less than about 1.5 weight percent, and can be as low as about 1 weight percent or below, based upon the total weight of the finely textured reduced fat meat.

A further component of the meat block used in making the fat free meat is a traditional brine or a brine-like aqueous composition. This brine composition is typically primarily water and will include at least about 0.5 weight percent salt. In the case of hams, the brine composition has about 5% to about 8% salt. Flavoring and other components, such as preservatives and components useful for improving the firmness of the completed fat free meat, are preferably also included in the water composition. A usual ham curing brine composition contains salt, sodium nitrite, sodium ascorbate or the like, sugar and other ingredients. In a preferred embodiment, the brine composition is added to the components at a ratio of about 60 to 70 pounds of brine composition per 100 pounds of total meat component(s).

The water composition will have a fat content of substantially actual zero. Therefore, in accordance with generally well-known principles, the water composition will reduce the fat content of the meat block being prepared. Unlimited water cannot be added for various reasons if a satisfactory product is to be produced, as generally illustrated herein in connection with FIG. 5. In a typical fat free meat block combination, the weight of water composition generally approximates the weight of the muscle core meat cuts and is approximately twice the weight of the finely textured reduced fat meat when same is included in the meat block formulation. In the event that the finely textured reduced fat meat is not included, the weight of water composition can be greater than about one half of the muscle core meat cuts within the meat block. In an especially preferred arrangement, irrespective of the composition of the meat components, the cure yield should be about 165% on the basis of 100 parts by weight of total meat, although such cure yields could be as high as 180% or even greater.

Processing preferably includes treating at least the core meat cuts by some mechanical means, preferably including a macerator to soften or render them sticky. This can be followed by, substituted by, or used in combination with tumbling, mixing, massaging or combinations thereof. Tumbling times can be for about 5 to 8 hours.

The muscle core meat cuts, the finely textured reduced fat meat (when included) and the water composition are positioned within a confined space such as a mold, a so-called tin, a bag and the like. Same is then processed, typically in a conventional manner such as curing, smoking and/or cooking operations in order to make finished product. When the finished product takes the form of a loaf or log, for example, same can be readily sliced on commercial slicing equipment and packaged as desired and typically in manners well-known in the art.

In those instances where the muscle core meat cuts are to include three muscle core meat sources, or when Outside muscle core meat is to be included with only one of the other two muscle core meat groups, outside muscle separation proceeds as follows.

Figure 4:
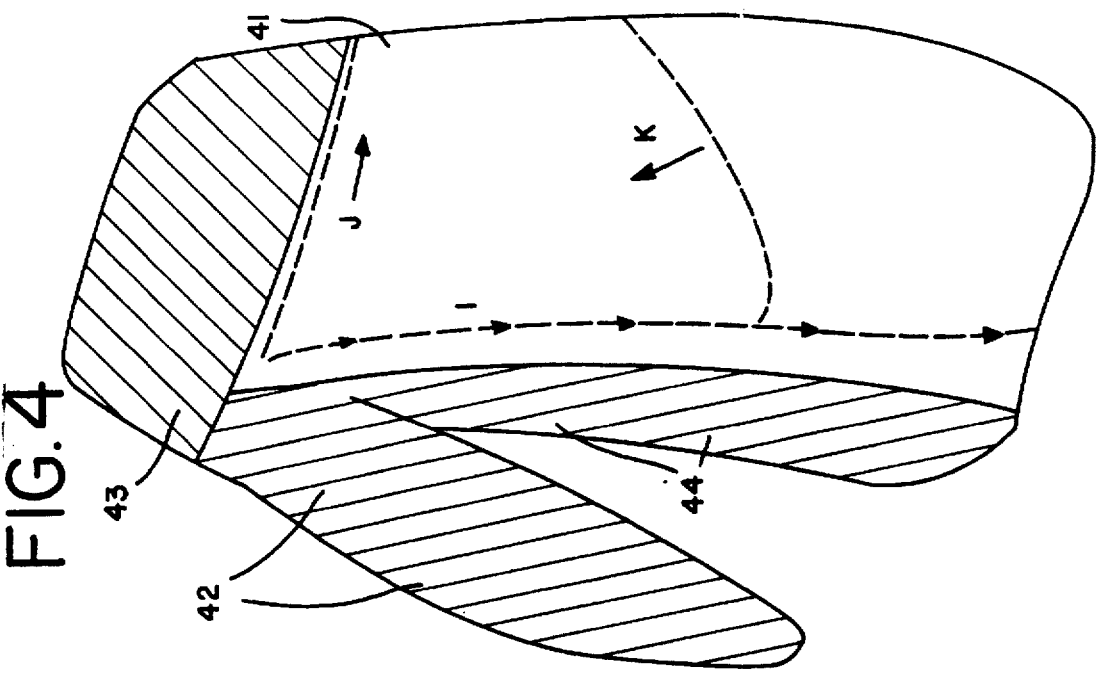
FIG. 4 is a schematic view illustrating outside core meat separation from Outside ham muscle.

FIG. 4 shows Biceps femoris 41, semitendinosus 42 and Gluteus superficialis 43. In this connection, a first cut is applied to the Outside muscle illustrated in FIG. 4 at a location approximately one-half inch of the natural seam between the Biceps femoris 41 and the Gluteobiceps 44, in the Biceps femoris muscle 41, as illustrated by cut line I. This cut is preferably made with a slight inward angle on the blade so as to avoid cutting into connective tissue along that seam. Once this cut has been made, it is preferred that a marbling score reading be made on that cut surface. If same is greater than 2.0 (using the National Pork Products Council scoring system), then the entire muscle is most likely unusable as a core meat component, and same should be incorporated into the residual trim cuts.

Assuming that the marbling score of the cut surface referred to in the previous paragraph is less than 2.0, then a second cut is made along the seam at the top of the Biceps femoris 41 and the upper smaller muscle (Gluteus superficialis 43) as illustrated at cut line J. The next step is a cut along cut line K which is made on the internal (medial) surface in order to remove a series of veins containing a significant of amount of fatty tissue. Preferably, approximately a ¾ inch section of tissue is removed from the internal surface of this Outside muscle. This piece is suitable for adding to the residual trim cuts. The remaining portion of the Outside muscle is the untrimmed outside core meat.

It is preferably membrane skinned to remove all surface fat and gristle. The thus trimmed outside muscle core meat cut has a fat content of between about 1.5 weight percent and about 2 weight percent fat, preferably between about 1.6% and about 2%, based upon the total weight of the outside muscle core meat.

In a typical three muscle core meat composition, the inside core meat and the knuckle core meat are at approximately equal weight percentages, while the outside core meat typically is less than one-half of either of the other core meat components. A preferred combination includes approximately 42%, plus or minus a few percent, of each of the inside core meat and of the knuckle core meat, with the remainder being outside core meat. For a typical two muscle core meat composition of inside core meat and knuckle core meat, the composition is approximately half and half of each type of core meat.

With further reference to the residual trim muscle cuts which are collected in accordance with the present invention, same typically will include connective tissue and/or gristle, as well as small deposits of fat or fatty tissue. It has been observed that muscle from which connective tissue, gristle and fatty tissue is removed has a significantly lower fat percentage. In this aspect of the invention, this removal of gristle and/or connective and/or fatty tissue is accomplished by mechanical separation at times referred to herein as mechanical de-gristling. With the fat content of the residual trim cuts being thus reduced, same can be suitable for incorporation into the combined meat block. Another option is to use the de-gristled residual trim cuts in the process for forming the finely textured reduced fat meat, although it can be possible to form the finely textured reduced fat meat from the residual trim cuts (and/or from various other meat sources) even without the mechanical de-gristling operation.

Examples of mechanical de-gristling include separation by pushing the muscle through a pin grid, by generally intermeshing gear wheels which can provide a generally continuous system, by pullers of tenderloins and the like, and by press molds which can be especially suitable for boneless shanks, tender tips and dark butts. In an exemplary situation, a residual trim cut having a fat percentage of 2.5 weight percent will be composed of lean muscle having a fat percentage of about 1 weight percent and gristle having a fat percentage of about 5 weight percent. Removal of all gristle would result in a muscle cut having a fat content at a level of about 1 percent.

Mechanically de-gristled meat can be substituted for core meat in formulations according to the invention. Up to 100% substitution is possible, such as from zero to 60% by weight, usually between about 20 and about 50% when de-gristled meat is included.

Figure 5:
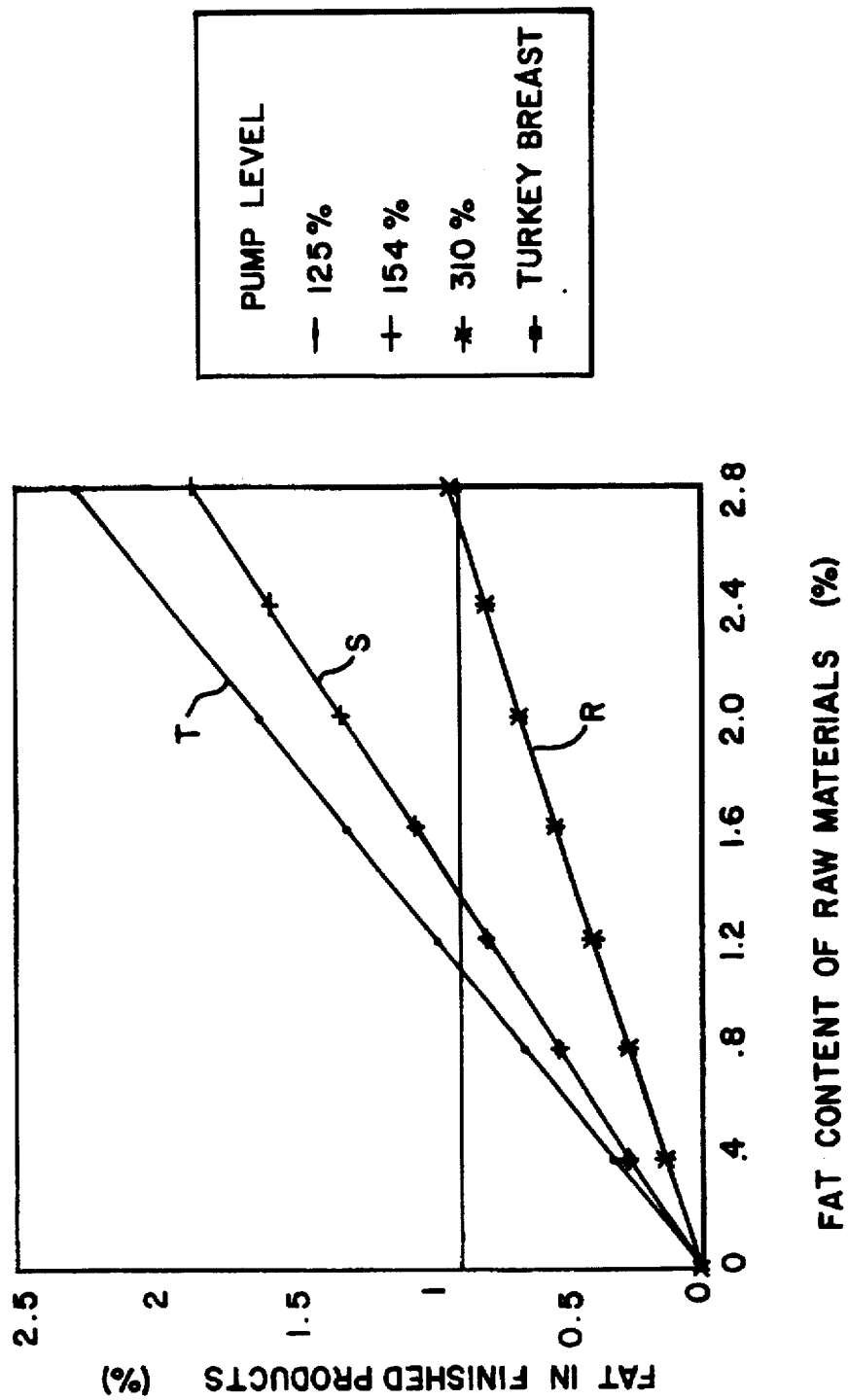
FIG. 5 is a plot of data illustrating fat content of finished ham due to water pump level and fat content of raw materials.

FIG. 5 illustrates a difficulty in producing a meat that qualifies as a fat free product. This illustrates the fat content of finished ham due to water composition pump level and fat content of the raw materials with which the water composition is combined. As a general rule, the more water added, the greater the fat which can be accommodated while still achieving a target level of 0.9% fat in the finished product. However, a product at the pump level of 310% illustrated by plot R would require about 3 parts of water to one part by weight of meat, which would be a soupy mixture totally unacceptable for a ham type of product.

Plot S illustrates a pump level of 154%, which happens to be about the same as for turkey breast. At this level, the target 0.9% fat in the finished product is achievable for a raw material fat content of on the order of about 1.4 weight percent. Typically, formulations according to this invention are illustrated by this pump level relationship and indicates 0.9% fat finished product can be prepared from raw material having fat contents of this general magnitude. This pump level is entirely acceptable for a ham type of product, as is indicated by its virtual identity with processed turkey breast moisture level. Plot T illustrates a somewhat lower pump level. In order to achieve the target of 0.9 weight percent fat or below in a finished ham product, the fat content of the raw materials would have to be at a much lower level, on the order of about 1 weight percent.

EXAMPLE 1

A three muscle core meat composition having a fat percentage of 1.3 weight percent was formulated by combining 43% of Inside muscle core meat cuts having a fat content of 1.1 weight percent, 41% of Knuckle muscle core meat at 0.9 weight percent fat, and 16% Outside muscle core meat having a fat content of 2% by weight.

This core meat is macerated at full overlap (7/16 inch) in order to soften and render sticky the muscle pieces. Finely textured reduced fat meat made in accordance with U.S. Pat. No. 5,382,444 (273 pounds) and about 600 pounds of brine solution are added to 636 pounds of the core meat, and the composition is tumbled for on the order of 8 hours. The composition is inserted into an elongated forming mold in order to form a ham meat block or log having a generally pear-shaped cross-section. After curing and cooking, the log is sliced and packaged into sliced ham having a fat content of less than 0.9 weight percent fat. The texture and taste approximates that of traditionally prepared, fully whole muscle ham, although visual evidence of fat specks is not visible in the slices of the fat free ham product.

EXAMPLE 2

A two muscle core meat composition was prepared to have 1.1% fat by combining 52% Inside muscle core meat cuts and 48% Knuckle core meat cuts. After maceration, 70 parts by weight of this core meat, 30 parts by weight of finely textured ham and 65 parts by weight of an aqueous composition were combined and tumbled. The aqueous composition contained about 4 parts by weight of salt and about 1 part by weight of carrageenan, as well as flavoring agents and preservatives. A smoked cooked ham was prepared by placing the formulation into a ham mold and cooking same in accordance with generally known ham preparation procedures. The resulting product was sliced for packaging as a fat free ham having a fat content of less than 0.9 weight percent fat. Its texture and taste approximate those of traditionally prepared ham.

EXAMPLE 3

A procedure generally in accordance with Example 2 was followed, except the aqueous composition included about 8.5 parts by weight of honey, and the finished product was a honey ham having a taste and texture approximating that of traditionally prepared honey ham.

EXAMPLE 4

The procedure of Example 2 was generally repeated. This time, the formulation contained about 5 parts by weight of honey, and additional flavoring components including maple and clove flavoring agents in order to prepare a baked ham product having a taste and texture approaching that of traditionally prepared baked ham.

EXAMPLE 5

A single muscle core meat composition is prepared from Knuckle core meat having a fat percent of about 1% by weight. It is macerated and tumbled and placed into a form and processed in the manner of a conventional ham product.

EXAMPLE 6

A meat composition of 35 pounds of macerated core meat, 30 pounds of finely textured reduced fat meat as described in Example 1, and 35 pounds of mechanically de-gristled residual trim muscle cuts is combined with 65 pounds of brine composition. Same is inserted into a shaping container for cooking into a pork meat product having a fat content of less than 0.5 gram of fat per 55 grams of meat product.

It will thus be seen that the present invention provides a new, useful and unique fat free product and process which have a number of advantages and characteristics including those pointed out herein and others which are apparent. Preferred embodiments of the invention have been described by way of example, and it is anticipated that modifications may be made to the described product and process without departing from the spirit of the invention or the scope of the appended claims.

I claim:

1. A process for producing substantially fat free meat on a production scale basis, said process comprising the steps of:

supplying whole muscle porcine sections at a production scale volume, each said porcine section having at least one naturally occurring and identifiable muscle;

locating one or more cut lines on each said porcine section for demarcating one or more of said naturally occurring and identifiable muscles;

separating said porcine sections along each said cut line and into muscle core meat cuts and residual trim cuts, said muscle core meat cuts having a fat percentage of less than about 2 weight percent, said residual trim cuts being higher fat cuts, said separating step avoiding grinding of said muscle core meat cuts such that said muscle core meat cuts are unground, and said separating step separating said residual trim cuts from said naturally occurring and identifiable muscles of said muscle core meat cuts;

providing a supply of finely textured reduced fat meat having a fat percentage of not greater than about 1.5 weight percent, based upon the weight of the reduced fat meat supply;

placing said unground muscle core meat cuts, said finely textured reduced fat meat, and a brine composition into a confined space, and forming said unground muscle core cuts, finely textured reduced fat meat and brine composition into a combined meat block, said combined meat block including said muscle core meat cuts which are unground; and processing said combined meat block into a meat product having a total fat percentage of less than about 1% by weight, based upon the total weight of the meat product.

2. The process in accordance with claim 1, wherein said muscle core meat cuts have an average fat percentage of not greater than about 1.4 weight percent, and said fat free meat has a total fat percentage of not greater than about 0.9% by weight.

3. The process in accordance with claim 1, wherein said muscle core meat cuts have an average fat percentage of not greater than about 1.3 weight percent.

4. The process in accordance with claim 1, wherein said muscle core meat cuts have an average fat percentage of not greater than about 1.2 weight percent.

5. The process in accordance with claim 1, wherein said step of providing finely textured reduced fat meat includes grinding and centrifuging a supply of meat.

6. The process in accordance with claim 1, further including removing connective tissue or gristle from said residual trim cuts in order to lower the fat percentage of said residual trim cuts to not greater than about 2 weight percent to form reduced fat residual trim cuts, and wherein said placing step includes adding said reduced fat residual trim cuts to said combined meat block.

7. The process in accordance with claim 6, wherein said reduced fat residual trim cuts and said muscle core meat cuts are present at a weight ratio of from 20:80 to 60:40.

8. The process in accordance with claim 6, wherein said removing step is a non-manual, mechanical degristling procedure.

9. The process in accordance with claim 6, wherein said placing step includes between about 60 and 70 parts by weight of said brine composition for each 100 parts by weight in total of said muscle core meat cuts, said finely textured reduced fat meat and said reduced fat residual trim cuts.

10. The process in accordance with claim 9, wherein said placing step incorporates said brine composition at a weight percent which is not greater than about the weight percent of said muscle core meat cuts.

11. The process in accordance with claim 6, wherein said placing step incorporates said muscle core meat cuts and said reduced fat residual trim cuts at approximately equal weight ratios.

12. The process in accordance with claim 1, wherein said separating step includes first separating said porcine sections into two or more different muscle groups, each muscle group containing one or more of said naturally occurring and identifiable muscles, and then subdividing said different muscle groups along said cut lines.

13. The process in accordance with claim 1, wherein said placing step includes between about 60 and 70 parts by weight of said brine composition for each 100 parts by weight in total of said muscle core meat cuts and said finely textured reduced fat meat.

14. The process in accordance with claim 1, wherein said placing step incorporates said muscle core meat cuts at a weight percent approximately equal to or greater than the weight percent of said finely textured reduced fat meat.

15. The process in accordance with claim 1, wherein said placing step incorporates said muscle core meat cuts at a weight percent approximately equal to or greater than the weight percent of said finely textured reduced fat meat.

16. A process for producing substantially fat free ham on a production-scale basis, said process comprising the steps of:

supplying hams from porcine animals, each said ham having at least one naturally occurring and identifiable muscle;

locating one or more cut lines on each said ham for demarcating one or more of said naturally occurring and identifiable muscles;

separating said hams along said cut lines into muscle core meat cuts and residual trim cuts, said muscle core meat cuts having a fat percentage of less than about 1.5 weight percent, said residual trim cuts being higher fat cuts, said separating step avoiding grinding of said muscle core meat cuts such that said muscle core meat cuts are unground, and said separating step separating said residual trim cuts from said naturally occurring and identifiable muscles of said muscle core meat cuts;

placing said unground muscle core meat cuts and a brine composition into a confined space and forming said unground muscle core meat cuts and brine composition into a combined meat block within said confined space, said combined meat block formation avoiding grinding of said muscle core meat cuts; and processing said combined meat block into a ham product having a total fat percentage of not greater than about 0.9% by weight.

17. The process in accordance with claim 16, further including grinding and centrifuging a supply of pork meat to provide a supply of finely textured reduced fat pork meat having a fat percentage of less than about 1.5 weight percent, and wherein said placing step further includes incorporating said finely textured reduced fat pork meat into said confined space and thus into said combined meat block and into said ham product.

18. The process in accordance with claim 17, wherein said placing step includes between about 60 and 70 parts by weight of said brine composition for each 100 parts by weight in total of said muscle core meat cuts and said finely textured reduced fat meat.

19. The process in accordance with claim 17, wherein said placing step incorporates said muscle core meat cuts at a weight percent approximately equal to or greater than the weight percent of said finely textured reduced fat meat.

20. The process in accordance with claim 19, wherein said placing step incorporates said muscle core meat cuts and said reduced fat residual trim cuts at approximately equal weight ratios.

21. The process in accordance with claim 16, wherein said muscle core meat cuts have an average fat percentage of not greater than about 1.4 weight percent, and said fat free ham has a total fat percentage of less than about 0.9% by weight.

22. The process in accordance with claim 16, wherein said muscle core meat cuts have an average fat percentage of not greater than about 1.3 weight percent.

23. The process in accordance with claim 16, wherein said muscle core meat cuts have an average fat percentage of not greater than about 1.2 weight percent.

24. The process in accordance with claim 16, further including removing connective tissue or gristle from said residual trim cuts in order to lower the fat percentage of said residual trim cuts to not greater than about 2 weight percent to form reduced fat residual trim cuts, and wherein said placing step includes adding said reduced fat residual trim cuts to said combined meat block.

25. The process in accordance with claim 24, wherein said reduced fat residual trim cuts and said muscle core meat cuts are present at a weight ratio of from 20:80 to 60:40.

26. The process in accordance with claim 24, wherein said removing step is a non-manual, mechanical degristling procedure.

27. The process in accordance with claim 24, wherein said placing step incorporates said muscle core meat cuts and said reduced fat residual trim cuts at approximately equal weight ratios.

28. The process in accordance with claim 16, wherein said separating step includes first separating said hams into two different muscle groups, each muscle group containing one or more of said naturally occurring and identifiable muscles, and then subdividing said different muscle groups along said cut lines.

29. The process in accordance with claim 16, wherein said separating step includes separating said hams into three different muscle groups, each muscle group containing one or more of said naturally occurring and identifiable muscles, and then subdividing said different muscle groups along said cut lines.

30. The process in accordance with claim 16, wherein said placing step incorporates said brine composition at a weight percent which is not greater than about the weight percent of said muscle core meat cuts.

31. The process in accordance with claim 16, wherein said placing step incorporates said brine composition at a weight percent which is not greater than about 70 weight percent of said muscle core meat cuts.

32. The process in accordance with claim 16, wherein said separating step includes first separating said hams into one or more of an Inside muscle group, a Knuckle muscle group and an Outside muscle group, each muscle group containing one or more of said naturally occurring and identifiable muscles, and subdividing at least one of said muscle groups along said cut lines.

33. The process in accordance with claim 32, wherein said naturally occurring and identifiable muscle is a Semimembranous muscle, and said subdividing includes removing Semimembranous muscle from said Inside muscle group.

34. The process in accordance with claim 32, wherein said naturally occurring and identifiable muscle is a Quadriceps femoris muscle and said subdividing includes removing Quadriceps femoris muscle including Rectus femoris muscle and Vastus lateralis muscle from said Knuckle muscle group.

35. The process in accordance with claim 32, wherein said naturally occurring and identifiable muscle is a Biceps femoris muscle and said subdividing includes removing said Biceps femoris muscle from said Outside muscle group.

36. The process in accordance with claim 16, wherein said separating step includes separating said hams into an Inside muscle group and a Knuckle muscle group, subdividing Semimembranous muscle as a naturally occurring and identifiable muscle from said Inside muscle group, and subdividing Rectus femoris muscle and Vastus lateralis muscle as other naturally occurring and identifiable muscles from said Knuckle muscle group; and wherein said placing step combines said Semimembranous muscle, said Rectus femoris muscle and said Vastus lateralis muscle as said muscle core meat cuts, said muscle core meat cuts having a combined fat percentage of about 1.2 weight percent.

37. The process in accordance with claim 16, wherein said separating step includes separating said hams into an Inside muscle group, a Knuckle muscle group and an Outside muscle group, subdividing Semimembranous muscle as a naturally occurring and identifiable muscle from said Inside muscle group, subdividing Rectus femoris muscle and Vastus lateralis muscle as other naturally occurring and identifiable muscles from said Knuckle muscle group, and subdividing Biceps femoris muscle as another of said naturally occurring and identifiable muscles from said Outside muscle group; and wherein said placing step combines said Semimembranous, Rectus femoris, Vastus lateralis and Biceps femoris muscles as said muscle core meat cuts, said muscle core meat cuts having a combined fat percentage of about 1.3 weight percentage.

* * * * *

UNITED STATES PATENT AND TRADEMARK OFFICE
CERTIFICATE OF CORRECTION

PATENT NO. : 5,674,550
DATED : October 7, 1997
INVENTOR(S) : Larry C. Gundlach, Andrew L. Milkowski, Sherel Frederick Nutt, and William T. Paulos It is certified that error appears in the above-indentified patent and that said Letters Patent is hereby corrected as shown below:

Col. 4, line 25, "to other" should read --to others--; line 46, "seventeen-pound" should read --seventeen pound--.
Col. 6, line 44, "is a made" should read --is made--.
Col. 7, line 42, "semitendinosus" should read --semitendinous--; line 63, "significant of amount" should read --significant amount--.
Col. 14, line 29, delete "weight percentage" and insert --weight percent--.

Signed and Sealed this

Twenty-second Day of September, 1998

Attest:

BRUCE LEHMAN

*Attesting Officer*          *Commissioner of Patents and Trademarks*